(12) United States Patent
Steidl et al.

(10) Patent No.: US 12,247,636 B2
(45) Date of Patent: Mar. 11, 2025

(54) TORSIONAL VIBRATION DAMPER

(71) Applicant: Hasse & Wrede GmbH, Berlin (DE)

(72) Inventors: Michael Steidl, Berlin (DE); Mandy Streifler, Berlin (DE); Stephan Bohmeyer, Hoppegarten (DE)

( * ) Notice: Subject to any disclaimer, the term of this patent is extended or adjusted under 35 U.S.C. 154(b) by 0 days.

(21) Appl. No.: 18/271,693

(22) PCT Filed: Jan. 12, 2022

(86) PCT No.: PCT/EP2022/050536
§ 371 (c)(1),
(2) Date: Jul. 11, 2023

(87) PCT Pub. No.: WO2022/152747
PCT Pub. Date: Jul. 21, 2022

(65) Prior Publication Data
US 2024/0318704 A1    Sep. 26, 2024

(30) Foreign Application Priority Data

Jan. 12, 2021 (DE) .................... 10 2021 100 431.4

(51) Int. Cl.
*F16F 15/173*    (2006.01)
*F16F 15/16*    (2006.01)

(52) U.S. Cl.
CPC .......... *F16F 15/173* (2013.01); *F16F 15/161* (2013.01); *F16F 2222/08* (2013.01);
(Continued)

(58) Field of Classification Search
None
See application file for complete search history.

(56) References Cited

U.S. PATENT DOCUMENTS

| 7,993,204 B2 | 8/2011 | Doegel |
| 9,841,061 B2 | 12/2017 | Bachmaier et al. |

(Continued)

FOREIGN PATENT DOCUMENTS

| DE | 196 26 729 A1 | 1/1998 |
| DE | 10 2007 054 570 A1 | 5/2009 |

(Continued)

OTHER PUBLICATIONS

International Preliminary Report on Patentability (PCT/IB/326 & PCT/IB/373) issued in PCT Application No. PCT/EP2022/050536 dated Jul. 27, 2023, including English translation of document C2 (German-language Written Opinion (PCT/ISA/237), filed on Jul. 11, 2023) (9 pages).

(Continued)

*Primary Examiner* — Vicky A Johnson
(74) *Attorney, Agent, or Firm* — Crowell & Moring LLP (57) ABSTRACT

A torsional vibration damper or torsional vibration absorber has a rotating system with: a primary mass, which is arranged on a rotatable shaft, for example on a crankshaft of an engine, in particular of an internal combustion engine, and preferably can be fastened for conjoint rotation; a secondary mass, which is movable relative to the primary mass; and an assembly for vibration damping and/or vibration absorption of the relative movement between the primary mass and the secondary mass. The assembly for vibration damping and/or vibration absorption of the relative movement between the primary mass and the secondary mass has at least one accumulator inside the rotating system of the torsional vibration damper or torsional vibration absorber.

17 Claims, 6 Drawing Sheets

(52) U.S. Cl.
CPC ..... *F16F 2228/066* (2013.01); *F16F 2230/18* (2013.01); *F16F 2232/02* (2013.01); *F16F 2236/08* (2013.01)

(56) References Cited

U.S. PATENT DOCUMENTS

| | | | |
|---|---|---|---|
| 2006/0247065 A1 | 11/2006 | Bach et al. | |
| 2009/0131178 A1 | 5/2009 | Dogel | |
| 2009/0133529 A1* | 5/2009 | Kister | F16F 15/162 464/27 |
| 2021/0003193 A1* | 1/2021 | Steidl | F16F 15/167 |

FOREIGN PATENT DOCUMENTS

| | | |
|---|---|---|
| DE | 10 2008 001 493 A1 | 11/2009 |
| DE | 10 2009 027 219 A1 | 12/2010 |
| DE | 10 2009 028 445 A1 | 2/2011 |
| DE | 20 2010 010 585 U1 | 4/2011 |
| FR | 2 551 519 A1 | 3/1985 |
| GB | 2 145 798 A | 4/1985 |
| JP | 2006-300327 A | 11/2006 |
| JP | 2009-518593 A | 5/2009 |
| JP | 2016-510864 A | 4/2016 |
| WO | WO 99/40333 A1 | 8/1999 |
| WO | WO 2007/065569 A1 | 6/2007 |
| WO | WO 2019/086258 A1 | 5/2019 |
| WO | WO 2020/069933 A1 | 4/2020 |

OTHER PUBLICATIONS

International Search Report (PCT/ISA/210) issued in PCT Application No. PCT/EP2022/050536 dated Apr. 26, 2022 with English translation (6 pages).
German-language Written Opinion (PCT/ISA/237) issued in PCT Application No. PCT/EP2022/050536 dated Apr. 26, 2022 (8 pages).
German-language Office Action issued in German Application No. 10 2021 100 431.4 dated Aug. 11, 2021 (8 pages).
Japanese-language Office Action issued in Japanese Application No. 2023-542511 dated Aug. 19, 2024 with English translation (9 pages).

* cited by examiner

TORSIONAL VIBRATION DAMPER

BACKGROUND AND SUMMARY

The invention relates to a torsional vibration damper or torsional vibration absorber. The invention also relates to a method for damping torsional vibrations of a crankshaft of an internal combustion engine.

Passive torsional vibration dampers or torsional vibration absorbers are formed from various members/components. In this instance, two or three of the following principles/components are used.

Component "Kinetic Energy Store":

Passive torsional vibration dampers or torsional vibration absorbers always have in their basic structure a store for kinetic energy which is formed by a seismic mass. This may advantageously be in the form of a centrifugal ring and is also referred to as a secondary mass.

Component "Potential Energy Store":

A store of potential energy can be formed by means of a torsion spring rigidity between the secondary mass (in particular the centrifugal ring) and a housing and/or hub portion which is also referred to as a primary mass.

Dissipative Component:

A damping element or component which, for example, acts by means of dry friction, viscosity damping or hydraulic damping may be provided as a dissipative component—depending on the construction type—between a primary mass (housing and/or hub portion) and the secondary mass—that is to say, for example, between the hub portion/housing and the centrifugal ring.

The seismic mass is always present with torsional vibration dampers or torsional vibration absorbers. With a torsional vibration damper, a dissipative component is additionally provided and in the absorber the "potential energy store". With a damped torsional vibration absorber, all three components are used. The damped torsional vibration absorber is referred to below as the "torsional vibration absorber".

In the passive torsional vibration dampers or torsional vibration absorbers currently configured in practice, all components are located in a sub-assembly, which is connected to the shaft in a co-rotating manner. This sub-assembly consequently forms a rotating system.

This may have the advantage that only a single sub-assembly is intended to be secured to the shaft which is intended to be damped/absorbed, but in practice it also has specific disadvantages.

Thus, with regard to the frequently limited structural space of a torsional vibration damper/torsional vibration absorber of the construction type mentioned above, it is not always possible to produce the required rigidity and damping. Heat which is produced as a result of the damping can further often be discharged only with difficulty. This problem therefore limits the function and service-life of the torsional vibration damper or torsional vibration absorber.

WO 2019/086 258 A1 describes a torsional vibration damper or torsional vibration absorber. There is set out a structure in which the oscillating movement between the centrifugal ring and housing of the torsional vibration damper or torsional vibration absorber which occurs in the rotating system is converted by means of a hydraulic leadthrough into a translational movement in an external fixed system.

Critical flow speeds in the hydraulic leadthrough are considered to be unfavorable.

An object of the present invention is to provide an improved torsional vibration damper or torsional vibration absorber of the generic type which does not have the existing disadvantages.

This object is achieved by the subject-matter of the independent claims. Advantageous embodiments of the invention can be derived from the dependent claims.

A torsional vibration damper or torsional vibration absorber according to the invention having a rotating system having a primary mass which is arranged on a rotatable shaft and which can preferably be secured in a rotationally secure manner and having a secondary mass which can be moved relative to the primary mass and having a sub-assembly for vibration damping and/or vibration absorption of the relative movement between the primary mass and the secondary mass is constructed in such a manner that the sub-assembly for vibration damping and/or vibration absorption of the relative movement between the primary mass and the secondary mass has at least one pressure store within the rotating system of the torsional vibration damper or the torsional vibration absorber.

A particular advantage is afforded in that, since the pressure stores are constructed at the rotating side, a rotary leadthrough, through which as in the prior art the hydraulic oil is guided outward, with all the disadvantages thereof, is not required. This makes it significantly easier for the necessary line cross sections to be produced in such a manner that the flow speeds of the hydraulic oil remain controllable.

A method according to the invention for damping torsional vibrations of a crankshaft of a piston machine having the above-described torsional vibration damper or torsional vibration absorber comprises the method steps of: providing the torsional vibration damper or torsional vibration absorber fitted to the crankshaft; adjusting at least one pressure store which is installed in the torsional vibration damper or torsional vibration absorber with a gas or air which is acted on with pressure; and damping the torsional vibrations of the crankshaft during operation of the piston machine using the torsional vibration damper or torsional vibration absorber.

This affords the advantage that hydraulic oil or fluid is located inside the torsional vibration damper and does not have to be fed in from outside during operation. An adjustment of the pressure stores with pressurized gas, for example, air, nitrogen or the like, is advantageously simple, even during operation.

In one embodiment, the sub-assembly for vibration damping and/or vibration absorption of the relative movement between the primary mass and the secondary mass has one or more fluid chamber(s) which is/are filled with a fluid and which is/are formed in the secondary mass, as part of the rotating system, wherein the volume of the fluid chambers in the event of torsional vibrations and resultant relative movements between the primary mass and secondary mass can be changed by means of the at least one pressure store, wherein the fluid chambers are each subdivided by radially extending vanes of a hub portion which is connected to the primary mass. This produces an advantageously compact structure.

In another embodiment, the at least one pressure store forms a gas spring and has at least one gas portion and at least one fluid portion which are separated by a membrane, wherein the fluid portion is connected to the fluid chambers by means of fluid lines. The fluid lines may advantageously be configured with respect to the flow speeds of the fluid which occur in such a manner that no critical flow speeds occur.

One embodiment makes provision for the at least one gas portion of the at least one pressure store to be connected via a rotary leadthrough by means of one or more pressure lines to a control/gas supply unit which is arranged outside the rotating system of the torsional vibration damper or torsional vibration absorber. As a result of the rotary leadthrough, in comparison with the prior art, only the pressure of the springs (and consequently the spring rate) is advantageously simply adjusted by means of pressurized gas or air.

In an alternative embodiment, the at least one pressure store is arranged on a vane of the hub portion and forms a gas spring having a chamber and a membrane, wherein the membrane delimits the chamber with respect to the fluid chamber. In this instance, the advantage is afforded that a rotary leadthrough is not required since the pressure stores are directly integrated in the torsional vibration damper. Although an adjustment of the pressure stores is then no longer possible during operation, an adjustment is still possible in the stationary state of the damper by means of corresponding valves. To this end, the chamber of the at least one pressure store may be connected to a filling connection by means of a valve. Naturally, there may also be a plurality of valves.

By means of the pressure in the chambers of the pressure stores, the rigidity of the system can advantageously be easily adjusted.

Another embodiment makes provision for the fluid chambers to be connected by means of lines in a hub portion which is connected to the primary mass, wherein the lines in each case have at least one adjustable throttle. In this manner, leakage loss as a result of overflowing can advantageously be compensated for and the flywheel mass can thus be fixed in its nominal position with respect to the damper. Another advantage is afforded in that the flywheel mass can be centered and does not have to be supported by means of additional springs.

It is advantageous for the fluid chambers to be connected by means of unidirectional, oppositely arranged overflow lines in the hub portion which is connected to the primary mass since an overflow between the chambers with an excessively powerful deflection of the damper is thus enabled in only one direction. In this manner, the flywheel mass can be kept centered.

An advantageous damping can additionally be achieved if fluid chamber portions which are formed by subdividing the fluid chambers by means of a respective vane are connected by means of at least one line with or without a throttle in a respective vane. The damping is produced by pumping the hydraulic oil back and forth through the vane between the fluid chambers or fluid chamber portions, wherein adjustable throttles can be used in order to adapt the damping to the respective requirements.

In another embodiment, two mutually diametrically opposed fluid chambers are provided in each case for an advantageous compact structure.

An advantageous embodiment of the method makes provision for the adjustment of the pressure stores in the second method step and in the third method step to be carried out by means of a rotary leadthrough of the torsional vibration damper or torsional vibration absorber via one or more pressure lines by means of a control/gas supply unit which is arranged outside the rotating system of the torsional vibration damper or torsional vibration absorber. In this instance, only the medium air or nitrogen is used, whereby a compact structure of the rotary leadthrough is produced.

In the embodiment of the torsional vibration damper without a rotary leadthrough, another embodiment of the method makes provision for the adjustment of the pressure stores and additional throttles in the stationary state of the torsional vibration damper to be carried out in the second method step, wherein in the third method step a damping of the torsional vibrations is carried out by pumping a fluid back and forth between fluid chambers. In comparison with a viscous damper, the advantage is also afforded in this instance of being able to adjust the damping and rigidity independently of each other. On the one hand, an optimum ratio can thus be found, on the other hand, it is possible to adapt the same damper hardware for different motors and thus to save costs.

In another embodiment of the method, in the third method step, in the event of excessively powerful deflections of the torsional vibration damper or torsional vibration absorber, an overflow is brought about in one direction between the fluid chambers by means of unidirectional overflow lines. Consequently, an advantageous centering of the flywheel mass can be achieved.

In contrast to conventional dampers, in the invention the costly leaf springs can be dispensed with. In comparison with a viscous damper, the advantage is also afforded in this instance of damping and rigidity being able to be adjusted independently of each other. On the one hand, an optimum ratio can thus be found, on the other hand, it is possible to adapt the same damper hardware for different motors and thus to save costs.

In another embodiment of the torsional vibration damper or torsional vibration absorber, the rotatable shaft is a crankshaft of a piston machine. Such a piston machine may, for example, be an internal combustion engine, a compressed air motor, a piston compressor or the like.

The piston machine of the method described above may, for example, be an internal combustion engine, a compressed air motor, a piston compressor or the like.

Embodiments of the invention are described below with reference to the appended drawings. These embodiments serve only to illustrate the invention with reference to preferred constructions which do not, however, conclusively constitute the invention. Thus, in the context of the claims, other embodiments and modifications and equivalents of the embodiments which are illustrated can also be produced.

DETAILED DESCRIPTION OF THE DRAWINGS

Figure 1:
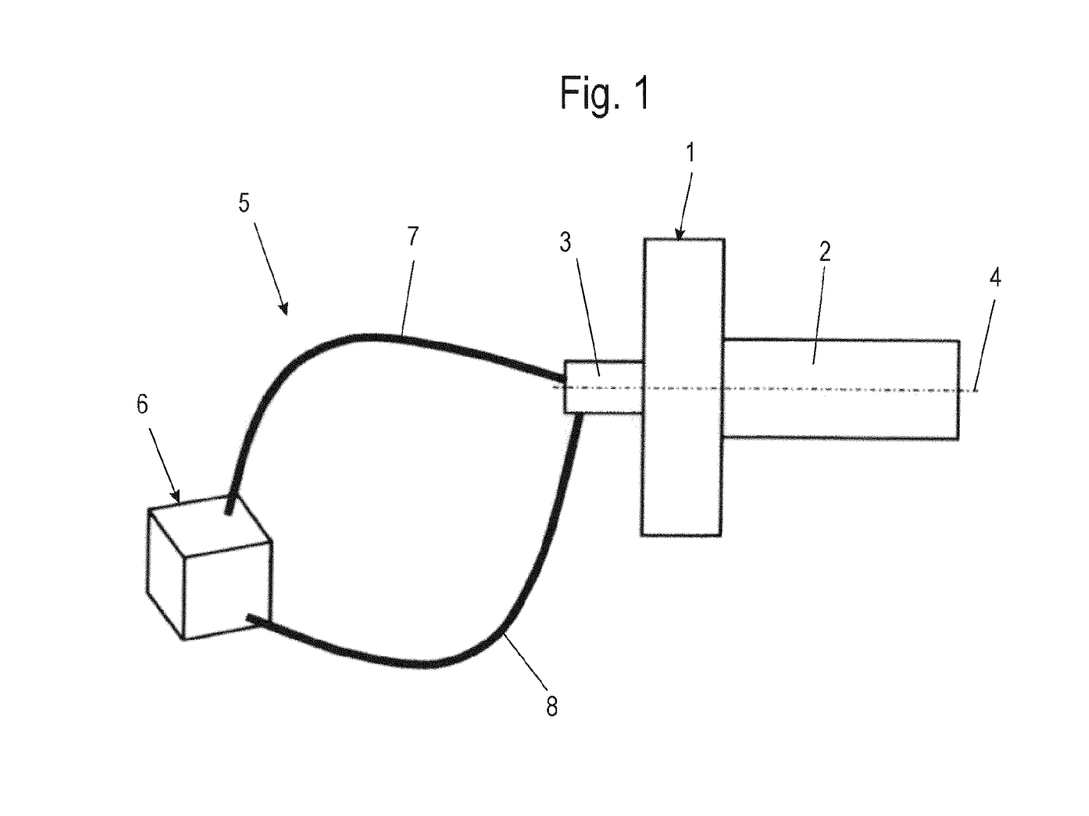
FIG. 1 is a schematic illustration of a first embodiment of a torsional vibration damper or torsional vibration absorber according to the invention.

FIG. 1 shows a schematic illustration of a first embodiment of a torsional vibration damper or torsional vibration absorber according to the invention.

The torsional vibration damper 1 or torsional vibration absorber is referred to below for the sake of simplicity only as a torsional vibration damper 1. It is connected in this instance in a rotationally secure manner to a crankshaft 2, for example, a crankshaft 2 of an internal combustion engine which is not illustrated. Such an internal combustion engine is, for example, a so-called large engine, for example, for ships, agricultural and construction machines, energy production.

The torsional vibration damper 1 additionally has a rotary leadthrough 3 by means of which it is connected to a supply sub-assembly 5.

The supply sub-assembly 5 comprises a control/gas supply unit 6 with pressure lines 7, 8.

The rotary leadthrough 3 forms an interface between the torsional vibration absorber 1 and the control/gas supply unit 6 of the supply sub-assembly 5, wherein the pressure lines 7, 8 form a connection between the control/gas supply unit 6 and the rotary leadthrough 3. By means of a pressure medium, preferably a gas, for example, compressed air, via the pressure lines 7, 8 and via the rotary leadthrough 3, the control/gas supply unit 6 controls control elements in the torsional vibration damper 1. These control elements are, for example, throttles and adjustable springs which are described in greater detail below.

The crankshaft 2 has a rotation axis 4 with respect to which the torsional vibration damper 1 and the rotary leadthrough 3 are arranged coaxially.

For extensive descriptions of the structure and the operation of torsional vibration dampers, reference may be made to the documents WO 2019/086 258 A1 and WO 2020/069 933 A1.

Figure 2:
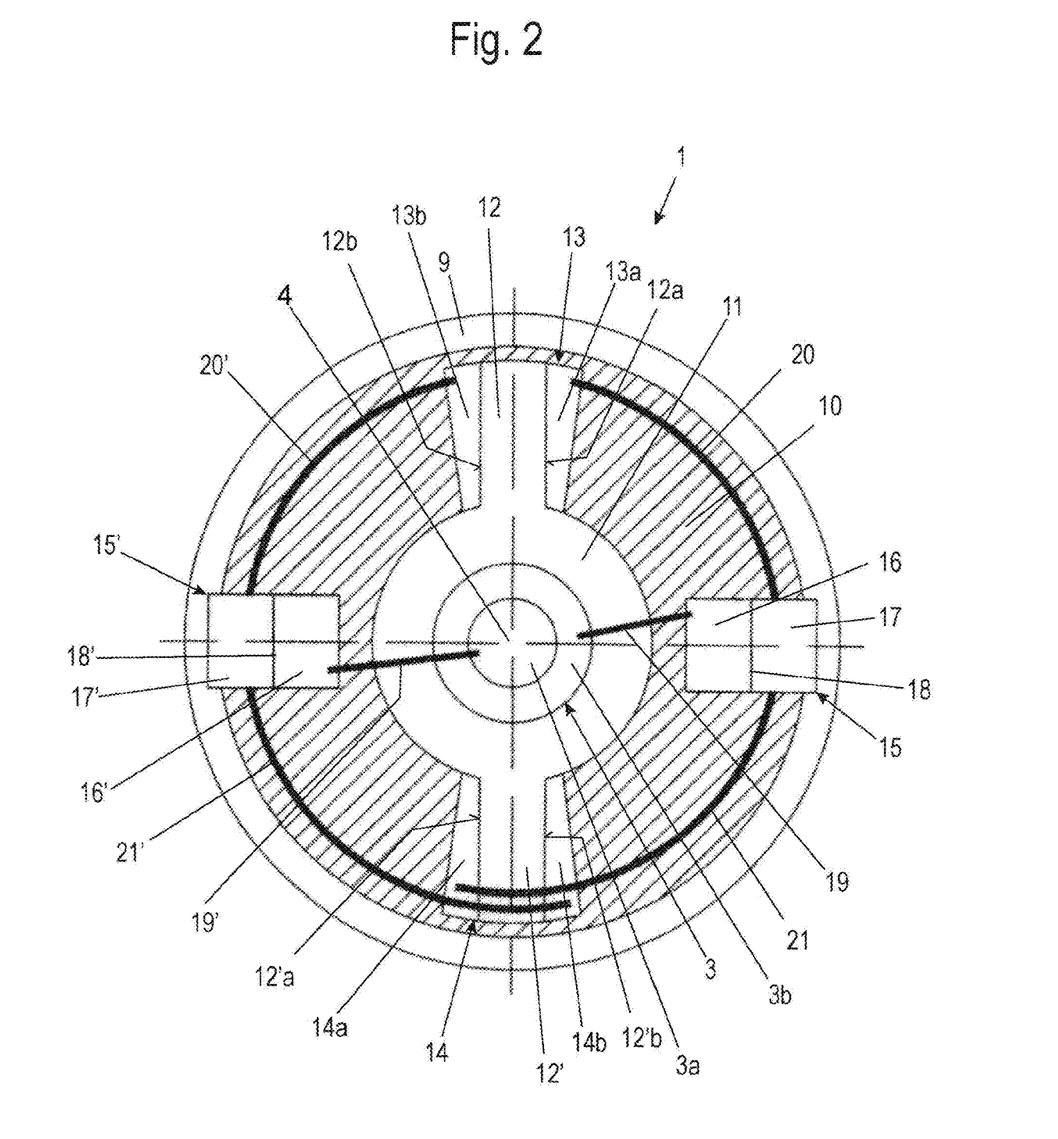
FIG. 2 is a schematic radially sectioned view of the first embodiment of the torsional vibration damper or torsional vibration absorber according to the invention according to FIG. 1.

FIG. 2 shows the first embodiment of the torsional vibration damper 1 according to the invention according to FIG. 1 in a radial section.

The torsional vibration damper 1 comprises a housing 9, a flywheel mass 10 as a so-called secondary mass, a hub portion 11 with vanes 12, 12', fluid chambers 13, 14 and pressure stores 15, 15'. This forms a so-called rotating system.

The housing 9 forms a so-called primary mass and is securely connected to the hub portion 11 and the vanes 12, 12' thereof. By means of the hub portion 11, the torsional vibration damper 1 is connected to the crankshaft 2 in a rotationally secure manner.

For better differentiation, the vanes 12, 12' are referred to as the first vane 12 and second vane 12'. The fluid chambers 13 and 14 are a first fluid chamber 13 and a second fluid chamber 14. The pressure stores 15, 15' are also referred to as the first pressure store 15 and second pressure store 15'. However, these specifications do not exclude that more than two vanes 12, 12', more than two fluid chambers 13, 14 and more than two pressure stores 15, 15' can be provided.

The housing 1, the rotary leadthrough 3 and the flywheel mass 10 are arranged coaxially with respect to the rotation axis 4. The flywheel mass 10 can rotate with respect to the housing 1.

The vanes 12, 12' of the hub portion 11 are securely connected to the housing 1.

The vanes 12, 12' of the hub portion 11 extend radially from the hub portion 11 opposite through diametrically opposed fluid chambers 13, 14 which are formed in the flywheel mass 10. Each fluid chamber 13,14 is divided by the associated vane 12, 12' of the hub portion 11 into two fluid chamber portions 13a, 13b and 14a, 14b.

The vanes 12, 12' each have two vane faces 12a, 12b; 12'a, 12'b, which in this instance in FIGS. 2 to 5 for easier identification are distinguished in accordance with the clockwise direction. The vane face 12a of the first vane 12 is thus in contact with the fluid in the fluid chamber portion 13a of the first fluid chamber 13 and the vane face 12'a of the second vane 12' is in contact with the fluid in the fluid chamber portion 14a of the second fluid chamber 14 and press them together when the hub portion 11 and the vanes 12, 12' pivot in the clockwise direction. Whereas the vane face 12b of the first vane 12 is in contact with the fluid in the fluid chamber portion 13b of the first fluid chamber 13 and the vane face 12'b of the second vane 12' is in contact with the fluid in the fluid chamber portion 14b of the second fluid chamber 14 and press them together when the hub portion 11 pivots with the vanes 12, 12' in the counter-clockwise direction.

Each pressure store 15, 15' forms a gas spring and in each case has a gas portion 16, 16' and a fluid portion 17, 17'. Each gas portion 16, 16' is separated from the associated fluid portion 17, 17' by means of a membrane 18, 18'.

The pressure stores 15, 15' are securely fitted to the housing 1.

The gas portions 16, 16' of the pressure stores 15, 15' are in each case connected by means of a gas line 19, 19' to a respective connection portion 3a, 3b of the rotary leadthrough 3. In this manner, the gas lines 19, 19 are in each case connected in terms of control via an associated pressure line 7, 8 to the control/gas supply unit 6 of the supply sub-assembly 5.

The fluid chamber portions 13a, 13b; 14a, 14b of the fluid chambers 13, 14 are in each case connected by means of a fluid line 20, 20'; 21, 21' to a fluid portion 17, 17' of a respective pressure store 15, 15' in such a manner that communicating or connected chamber portions are produced as follows.

The fluid lines 20, 20'; 21, 21' may be incorporated, installed and/or formed in the flywheel mass 10.

The fluid chamber portion 13a of the first fluid chamber 13 is connected by means of the fluid line 20 to the fluid portion 17 of the first pressure store 15 which in turn is connected by means of the fluid line 21 to the vane chamber portion 14a of the second fluid chamber 14. In a similar manner, the fluid chamber portion 13b of the first fluid chamber 13 is connected by means of the fluid line 20' to the fluid portion 17' of the second pressure store 15' which in turn is connected by means of the fluid line 21' to the vane chamber portion 14b of the second fluid chamber 14.

In this manner, an oscillating movement of the hub portion 11 via the vanes 12, 12' and the above-described communication of the fluid chamber portions 13a, 13b; 14a, 14b through the fluid lines 20, 20'; 21, 21' is converted by means of the pressure chambers 15, 15' into translational movements of the membranes 18, 18' of the pressure chambers 15 15', wherein standard components can be used to provide rigidity and damping.

The pressure stores 15, 15' are thus produced at the rotating side, that is to say, in the torsional vibration damper 1, and can be adjusted/displaced by means of the control/gas supply unit 6 during operation of the torsional vibration damper 1 and via the membranes 18, 18' influence the flow between the above-described chambers. The rotary leadthrough 3 is used only to adjust the pressure in the pressure stores 15, 15' and consequently the spring rate. Consequently, the spring rates of the gas springs formed by the pressure stores 15, 15' can be adjusted from the exterior.

In this instance, the advantage is also afforded that the flywheel mass, that is to say, the flywheel mass 10, remains in its nominal position with respect to the housing 9. This is carried out by compensating for leakage losses as a result of overflow of fluid between the chambers via the above-described communication paths.

Figure 3:
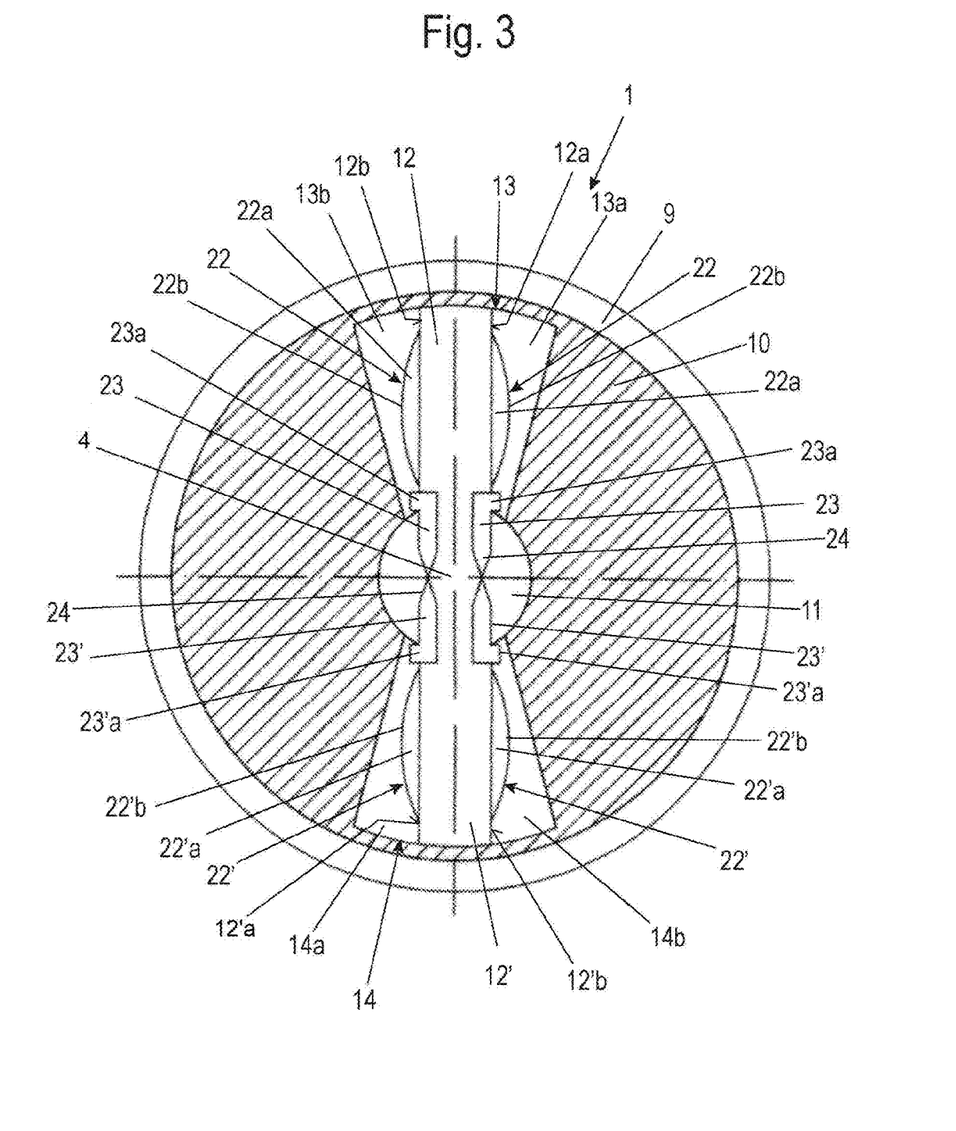
FIGS. 3-5 are schematic radially sectioned views of embodiments and variants of torsional vibration dampers or torsional vibration absorbers according to the invention.
Figure 4:
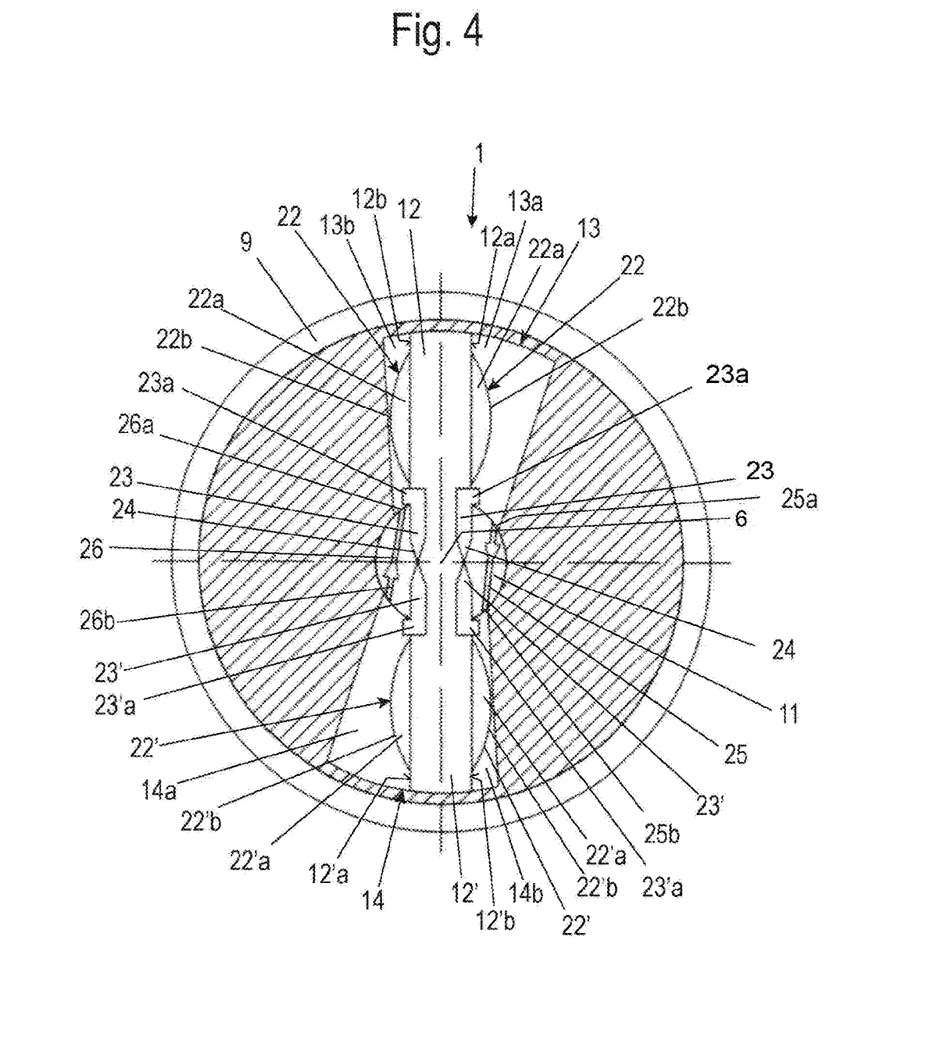
Figure 5:
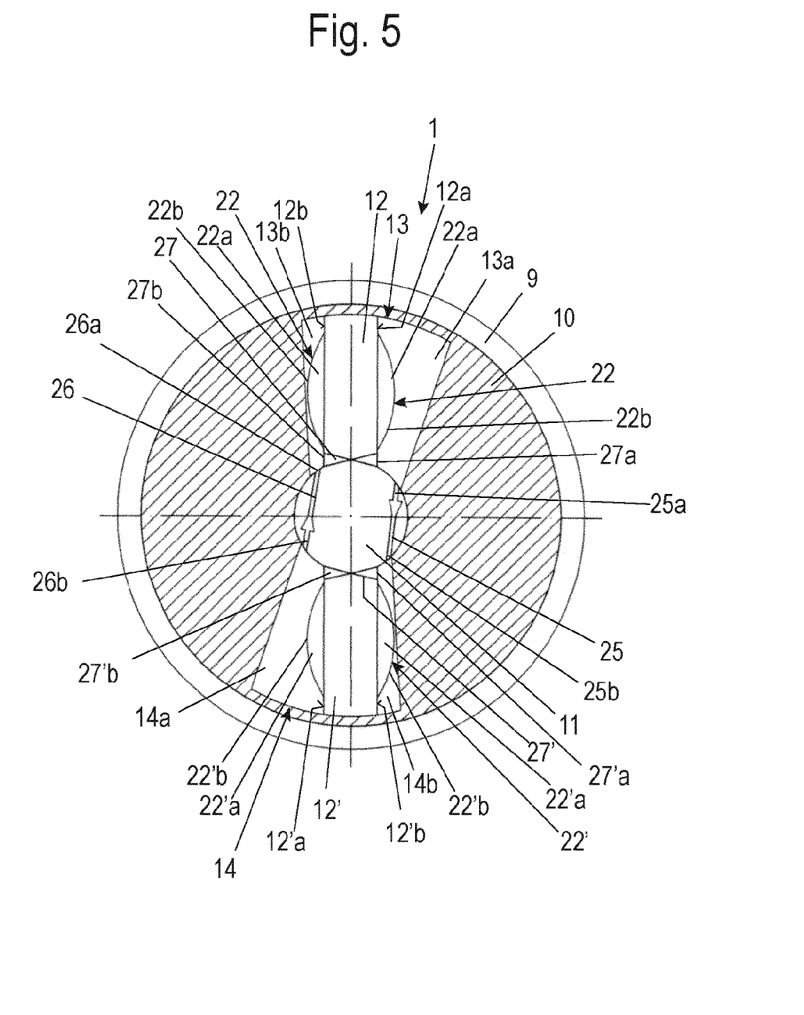

FIGS. 3 to 5 show schematic radially sectioned views of additional embodiments of torsional vibration dampers 1 or torsional vibration absorbers according to the invention.

FIG. 3 shows a second embodiment of the torsional vibration damper 1.

The structure of the second embodiment of the torsional vibration damper 1 differs from the first embodiment in that no rotary leadthrough 3 is provided. This is because the energy stores 22, 22' in the form of air springs or gas springs are integrated directly in the torsional vibration damper 1.

The energy stores 22, 22' are in this instance fitted to/in the vanes 12, 12' in such a manner that inflatable chambers 22a, 22'a are formed at both sides of the vanes 12, 12' with membranes 22b, 22'b, for example, made of elastomer material.

The chambers 22a, 22'a are similar to the gas portions 16, 16' of the energy stores 15, 15'. The membrane 22b, 22'b separates the chambers 22a, 22'a directly from the fluid chamber portions 13a, 13b; 14a, 14b, which in a similar manner correspond to the fluid portions 17, 17' of the energy stores 15, 15'.

The chambers 22a, 22'a are connected by means of valves which are not shown to one or more filling connections which are not shown and via which the chambers 22a, 22'a are then filled with a gas, for example, air and/or nitrogen. By means of the pressure in the chambers 22a, 22'a, the rigidity of the system is adjusted A damping is produced by pumping the fluid back and forth between the fluid chambers 13, 14. To this end, lines 23, 23' are provided in the hub portion 11 between the fluid chambers 13, 14. The pumping back and forth of the fluid is carried out by means of relative movements of the vanes 12, 12' with respect to the flywheel mass 10.

The line 23 is connected by means of an opening 23a to the fluid chamber portion 13a of the fluid chamber 13 and with another end by means of a throttle 24 to the line 23'. The line 23' is in turn connected by means of an opening 23'a to the fluid chamber portion 14b, which is located at the same vane side, of the fluid chamber 14. In a mirror-symmetrical structure, additional lines 23, 23' with openings 23a, 23'a and throttles 24 connect the fluid chamber portion 13b of the fluid chamber 13 to the fluid chamber portion 14a of the fluid chamber 14.

The throttles 24 are adjustable in order to be able to adapt the damping to the respective requirements.

An adjustment of the energy stores 22, 22' and throttles 24 cannot be carried out during operation of the torsional vibration damper 1. This is carried out in a stationary state using suitable valves which are not shown here but are readily conceivable.

FIG. 4 shows a variant of the second embodiment according to FIG. 3.

In this instance, a deflected position of the torsional vibration damper 1 is shown.

In contrast to the second embodiment, in this variant two overflow lines 25, 26 which in each case extend parallel with the lines 23, 23' and throttles 24 are formed in the hub portion 11.

The overflow line 25 forms a unidirectional overflow from the fluid chamber portion 13a of the fluid chamber 13 to the fluid chamber portion 14b, which is located at the same vane side, of the fluid chamber 14. A unidirectional overflow of the fluid chamber portion 14a of the fluid chamber 14 to the fluid chamber portion 13b of the fluid chamber 13 is enabled by means of the other overflow line 26.

The overflow lines 25, 26 are arranged in opposing directions, that is to say, the direction of the flow flowing through the overflow line 25 is the reverse of the direction of the flow flowing through the overflow line 26.

The overflow lines 25, 26 may also have adjustable throttles which are not shown.

In this manner, in the event of excessively powerful deflection of the torsional directional damper 1 in a direction by means of the overflow lines 25, 26, the overflow between the fluid chambers 13 and 14 is enabled by means of return flow into the other fluid chamber, whereby the flywheel mass 10 is kept centered.

FIG. 5 shows another variant of the variant according to FIG. 4.

In this instance, a deflected position of the torsional vibration damper 1 is shown.

In place of lines 23, 23' in the hub portion 11, in this variant lines in the form of throttles 27, 27' are provided in a respective vane 12, 12'.

The throttle 27 in the vane 12 is connected with an opening 27a to the fluid chamber portion 13a of the fluid chamber 13, wherein an opposing opening 27b produces the connection to the other fluid chamber portion 13b of the fluid chamber 13.

In a similar manner, the throttle 27' in the other vane 12' is connected with an opening 27'a to the fluid chamber portion 14b of the fluid chamber 14, wherein an opposing opening 27'b of the throttle 27' connects this throttle 27' to the other fluid chamber portion 14a of the fluid chamber 14.

A damping is carried out in this variant by pumping the fluid back and forth between the fluid portions 13a, 13b of the fluid chamber 13 and between the fluid portions 14a, 14b of the other fluid chamber 14.

Figure 6:
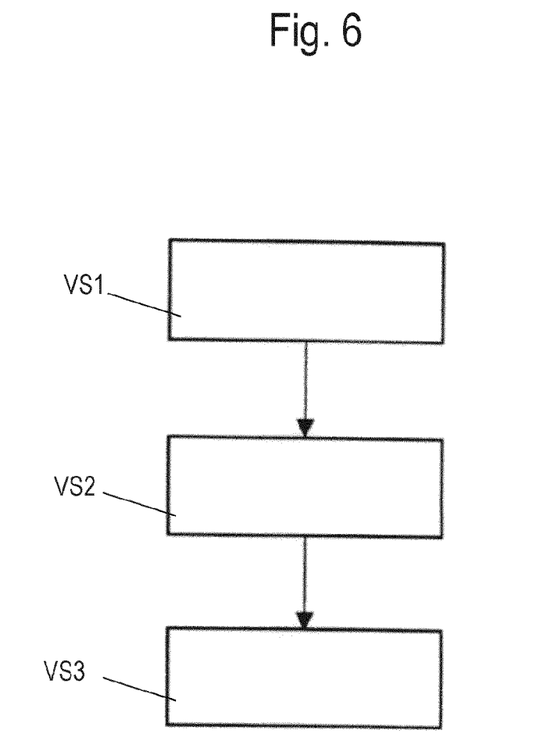
FIG. 6 is a schematic flow diagram of a method according to the invention.

FIG. 6 shows a schematic flow diagram of a method according to the invention for damping torsional vibrations of a crankshaft 2 of an internal combustion engine.

In a first method step VS1, the torsional vibration damper 1 or torsional vibration absorber is provided on the crankshaft 2.

In a second method step VS2, the pressure stores 15, 15' are adjusted with a gas or air which is acted on with pressure.

In a third method step VS3, the torsional vibrations of the crankshaft 2 are damped during operation of the internal combustion engine by means of the torsional vibration damper 1 or torsional vibration absorber.

The adjustment of the pressure stores 15, 15' is carried out in the second method step VS2 and in the third method step VS3 by means of an external supply sub-assembly via the rotary leadthrough 3 of the torsional vibration damper 1.

In a variant, the torsional vibration damper 1 has no rotary leadthrough 3. The pressure stores 15, 15' and other throttles 24, 27, 27' in the stationary state of the torsional vibration damper 1 are then adjusted in the second method step VS2. In this instance, in the third method step VS3 there is a damping of the torsional vibrations by pumping the fluid back and forth between the fluid chambers 13, 14.

In addition, in the third method step VS3 an overflow in the event of excessively powerful deflections of the torsional vibration damper 1 in a direction between the fluid chambers 13, 14 is enabled by means of unidirectional overflow lines 25, 26.

LIST OF REFERENCE NUMERALS

1 Torsional vibration damper
2 Crankshaft
3 Rotary leadthrough 3a, 3b Connection portion
4 Rotation axis
5 Supply sub-assembly
6 Control/gas supply unit
7, 8 Pressure line
9 Housing
10 Flywheel
11 Hub portion
12, 12' Vane
12a, 12b; 12'a, 12'b Vane face
13, 14 Fluid chamber
13a, 13b; 14a, 14b Fluid chamber portion
15, 15' Pressure store
16, 16' Gas portion
17, 17' Fluid portion
18, 18' Membrane
19, 19' Gas line
20, 20'; 21, 21' Fluid line
22, 22' Pressure store
22a, 22'a Chamber
22b, 22'b Membrane
23, 23' Line
23a, 23'a; 23b, 23'b Opening
24 Throttle
25, 26 Overflow line
25a, 25b; 26a, 26b Opening
27, 27' Throttle
27a, 27'a; 27b, 27'b Opening
VS1, VS2, VS3 Method step

The invention claimed is:

1. A torsional vibration damper or torsional vibration absorber, comprising:
   a rotating system having: (i) a primary mass, which primary mass is arranged on a rotatable shaft and which is securable in a rotationally secure manner, (ii) a secondary mass which is movable relative to the primary mass, and (iii) a sub-assembly for vibration damping and/or vibration absorption of the relative movement between the primary mass and the secondary mass, wherein
   the sub-assembly for vibration damping and/or vibration absorption of the relative movement between the primary mass and the secondary mass has at least one pressure store inside the rotating system of the torsional vibration damper or the torsional vibration absorber.

2. The torsional vibration damper or torsional vibration absorber according to claim 1, wherein
   the sub-assembly for vibration damping and/or vibration absorption of the relative movement between the primary mass and the secondary mass has one or more fluid chamber(s) which is/are filled with a fluid and which is/are formed in the secondary mass, as part of the rotating system,
   wherein a volume of the fluid chambers in an event of torsional vibrations and resultant relative movements between the primary mass and secondary mass is changeable by way of the at least one pressure store,
   wherein the fluid chambers are each subdivided by radially extending vanes of a hub portion which is connected to the primary mass.

3. The torsional vibration damper or torsional vibration absorber according to claim 2, wherein
   the fluid chambers are connected by lines in a hub portion which is connected to the primary mass,
   the lines in each case have at least one adjustable throttle.

4. The torsional vibration damper or torsional vibration absorber according to claim 2, wherein
   the fluid chambers are connected by unidirectional oppositely arranged overflow lines in a hub portion which is connected to the primary mass.

5. The torsional vibration damper or torsional vibration absorber according to claim 2, wherein
   fluid chamber portions which are formed by subdividing the fluid chambers by way of a respective vane are connected by at least one line with or without a throttle in a respective vane.

6. The torsional vibration damper or torsional vibration absorber according to claim 2, wherein
   two mutually diametrically opposed fluid chambers are provided in each case.

7. The torsional vibration damper or torsional vibration absorber according to claim 1, wherein
   the rotatable shaft is a crankshaft of a piston machine.

8. The torsional vibration damper or torsional vibration absorber according to claim 7, wherein
   the piston machine is an internal combustion engine, a compressed air motor or a piston compressor.

9. A torsional vibration damper or torsional vibration absorber, comprising:
   a rotating system having: (i) a primary mass, which primary mass is arranged on a rotatable shaft and which is securable in a rotationally secure manner, (ii) a secondary mass which is movable relative to the primary mass, and (iii) a sub-assembly for vibration damping and/or vibration absorption of the relative movement between the primary mass and the secondary mass, wherein
   the sub-assembly for vibration damping and/or vibration absorption of the relative movement between the primary mass and the secondary mass has at least one pressure store inside the rotating system of the torsional vibration damper or the torsional vibration absorber,
   the sub-assembly for vibration damping and/or vibration absorption of the relative movement between the primary mass and the secondary mass has one or more fluid chamber(s) which is/are filled with a fluid and which is/are formed in the secondary mass, as part of the rotating system,
   wherein a volume of the fluid chambers in an event of torsional vibrations and resultant relative movements between the primary mass and secondary mass is changeable by way of the at least one pressure store,
   wherein the fluid chambers are each subdivided by radially extending vanes of a hub portion which is connected to the primary mass,
   wherein
   the at least one pressure store forms a gas spring and has at least one gas portion and at least one fluid portion, which are separated by a membrane,
   the fluid portion is connected to the fluid chambers by fluid lines.

10. The torsional vibration damper or torsional vibration absorber according to claim 9, wherein
    the at least one gas portion of the at least one pressure store is connected via a rotary leadthrough by way of one or more pressure lines to a control/gas supply unit which is arranged outside the rotating system of the torsional vibration damper or torsional vibration absorber.

11. A torsional vibration damper or torsional vibration absorber, comprising:
    a rotating system having: (i) a primary mass, which primary mass is arranged on a rotatable shaft and which is securable in a rotationally secure manner, (ii) a secondary mass which is movable relative to the primary mass, and (iii) a sub-assembly for vibration damping and/or vibration absorption of the relative movement between the primary mass and the secondary mass, wherein the sub-assembly for vibration damping and/or vibration absorption of the relative movement between the primary mass and the secondary mass has at least one pressure store inside the rotating system of the torsional vibration damper or the torsional vibration absorber, wherein the at least one pressure store is arranged on a vane of a hub portion and forms a gas spring having a chamber and a membrane, the membrane delimits the chamber with respect to the fluid chamber.

12. The torsional vibration damper or torsional vibration absorber according to claim 11, wherein the chamber of the at least one pressure store is connected to a filling connection by a valve.

13. A method for damping torsional vibrations of a crankshaft of a piston machine having a torsional vibration damper or torsional vibration absorber, the method comprising:

(S1): providing the torsional vibration damper or torsional vibration absorber fitted to the crankshaft, wherein the damper or absorber comprises:

a rotating system having: (i) a primary mass, which primary mass is arranged on a rotatable shaft and which is securable in a rotationally secure manner, (ii) a secondary mass which is movable relative to the primary mass, and (iii) a sub-assembly for vibration damping and/or vibration absorption of the relative movement between the primary mass and the secondary mass, wherein the sub-assembly for vibration damping and/or vibration absorption of the relative movement between the primary mass and the secondary mass has at least one pressure store inside the rotating system of the torsional vibration damper or the torsional vibration absorber, (S2): adjusting the at least one pressure store which is installed in the torsional vibration damper or torsional vibration absorber with a gas or air which is acted on with pressure; and (S3): damping the torsional vibrations of the crankshaft during operation of the piston machine by way of the torsional vibration damper or torsional vibration absorber.

14. The method according to claim 13, wherein adjustment of the at least one pressure store is, in the second method step (S2) and in the third method step (S3), carried out by way of a rotary leadthrough of the torsional vibration damper or torsional vibration absorber via one or more pressure lines by a control/gas supply unit which is arranged outside the rotating system of the torsional vibration damper or torsional vibration absorber.

15. The method according to claim 13, wherein adjustment of the at least one pressure store and additional throttles in a stationary state of the torsional vibration damper is carried out in the second method step (S2), wherein in the third method step (S3) a damping of the torsional vibrations is carried out by pumping a fluid back and forth between fluid chambers.

16. The method according to claim 13, wherein in the third method step (VS3), in an event of excessively defined deflections of the torsional vibration damper or torsional vibration absorber, an overflow is brought about in one direction between the fluid chambers by way of unidirectional overflow lines.

17. The method according to claim 13, wherein the piston machine is an internal combustion engine, a compressed air motor, or a piston compressor.

* * * * *